United States Patent [19]

Farwell et al.

[11] Patent Number: 5,062,001
[45] Date of Patent: Oct. 29, 1991

[54] GRAY SCALE SYSTEM FOR VISUAL DISPLAYS

[75] Inventors: Randall S. Farwell; Lane T. Hauck, both of San Diego; Leonid Shapiro, Lakeside, all of Calif.

[73] Assignee: Proxima Corporation, San Diego, Calif.

[21] Appl. No.: 507,630

[22] Filed: Apr. 11, 1990

Related U.S. Application Data

[63] Continuation of Ser. No. 222,144, Jul. 21, 1988, abandoned.

[51] Int. Cl.$^5$ .............................................. H04N 5/74
[52] U.S. Cl. ..................................... 358/236; 340/793
[58] Field of Search ....................... 358/240, 160, 236; 340/793

[56] References Cited

U.S. PATENT DOCUMENTS 3,975,584  8/1976  Gordon ............................... 358/240
4,300,162  11/1981  Robers ................................ 358/160

OTHER PUBLICATIONS

Zeng et al., "Pseudorandom Bit Generators in Stream-Cipher Cryptography", Computer, Feb. 1991, pp. 8-17.

Primary Examiner—James J. Groody
Assistant Examiner—David E. Harvey
Attorney, Agent, or Firm—Bernard L. Kleinke; William Patrick Waters; Jerry R. Potts

[57] ABSTRACT

An image is projected in gray scale on a large screen without any flicker, the different colors or shades being indicated on the screen by individual shades of gray. The image is defined by a plurality of pixels which are raster scanned. At each pixel position, a plurality of first digital signals are generated each representing an individual primary color (e.g. red, green and blue) or shade in the image at the position. Second digital signals individually representing such different colors or shades are also produced on a pseudo-random basis -e.g. by producing video clocked signals not only at the pixel positions but also during the horizontal and vertical retraces. The second signals are repetitively counted to a particular value to correspond to successive frames in the video image. In each successive frame, the first signals are compared in value with the second signals at each individual pixel position. A video signal is produced for generating the image for that pixel on the large screen only when the first signals for each pixel in a raster scan have a greater digital significance than, or an equal significance to, the second signals for that pixel in that raster scan. In each repetive count of frames to the particular value, a video signal is produced for each pixel in a number of frames dependent upon the digital significance of the first digital signals for that pixel. However, such video signals are produced for each pixel in a different pattern in each repetitive count to the particular value so as to eliminate any flicker in the video image on the large screen for that pixel.

25 Claims, 2 Drawing Sheets

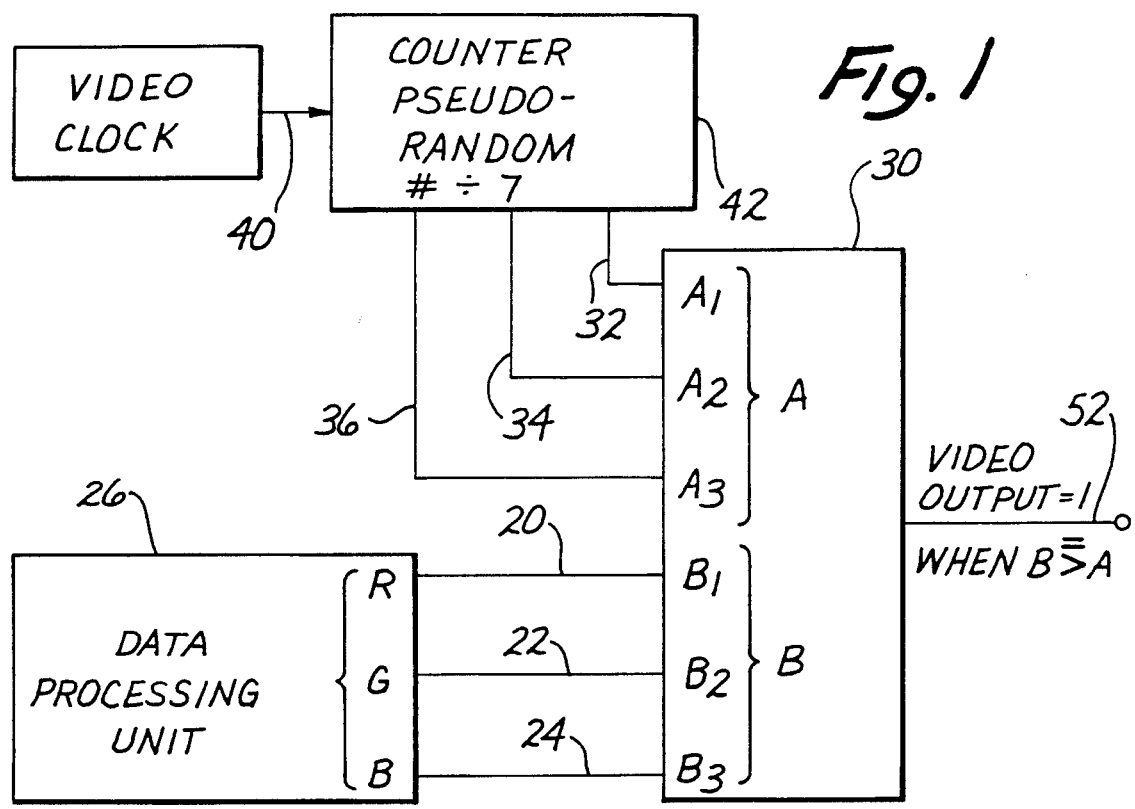
Fig. 1
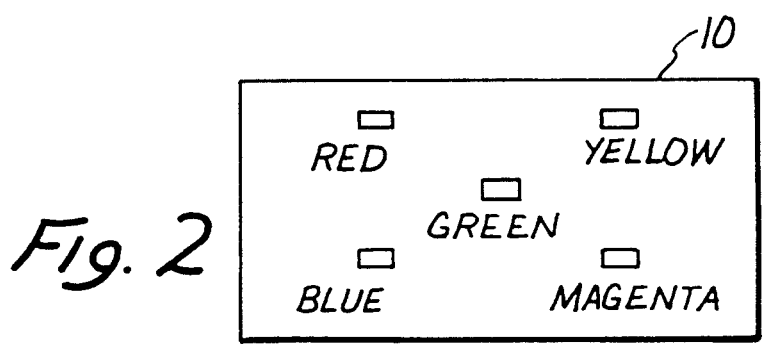
Fig. 2
Fig. 3
| | R | G | B | GREY |
|---|---|---|---|---|
| BLACK | 0 | 0 | 0 | 0/7 |
| BLUE | 0 | 0 | 1 | 4/7 |
| GREEN | 0 | 1 | 0 | 5/7 |
| CYAN | 0 | 1 | 1 | 3/7 |
| RED | 1 | 0 | 0 | 6/7 |
| MAGENTA | 1 | 0 | 1 | 2/7 |
| YELLOW | 1 | 1 | 0 | 1/7 |
| WHITE | 1 | 1 | 1 | 7/7 |

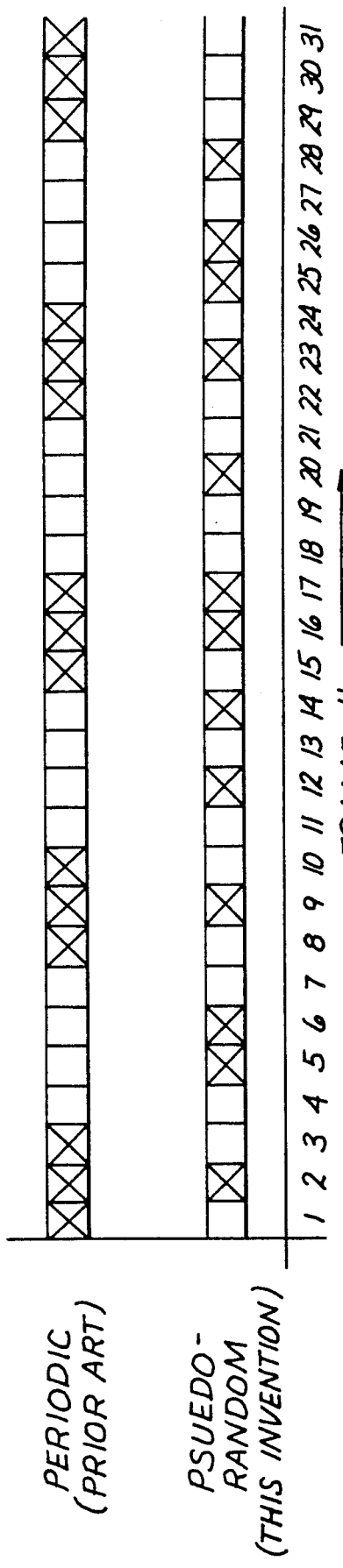
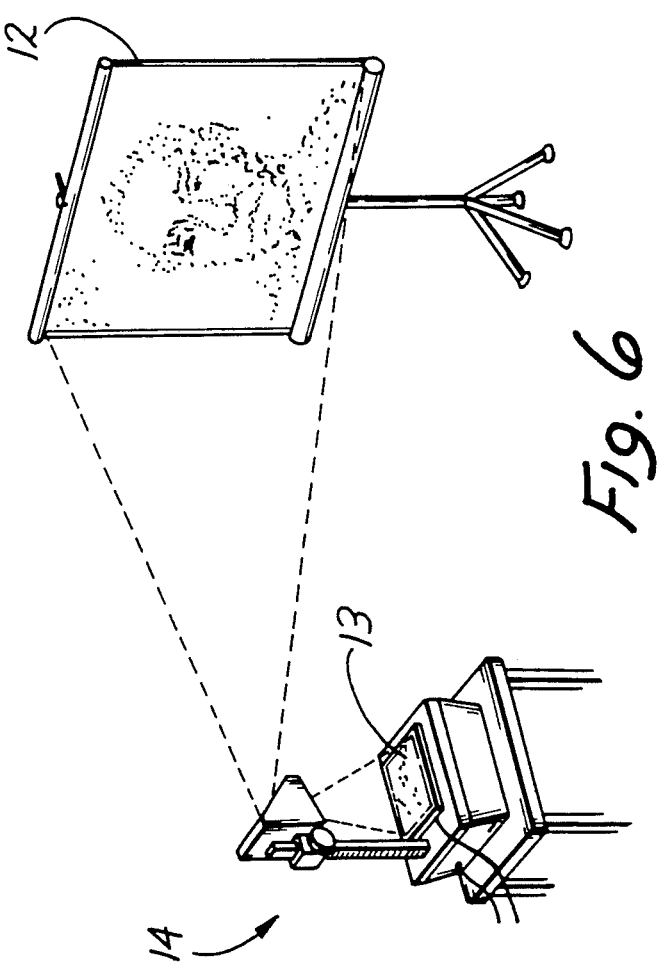

GRAY SCALE SYSTEM FOR VISUAL DISPLAYS

This is a continuation of application Ser. No. 07/222,144, filed on July 21, 1988 now abandoned.

This invention relates to apparatus for displaying visual images on a screen. More particularly, the invention relates to apparatus for displaying images in a gray scale on a video screen without any flicker in the displayed images. The invention also relates to a method of providing such displays.

Visual images are formed in color or different shades for a variety of purposes. For example, images of data processed by data processing systems are often displayed in color on visual screens associated with such data processing systems. However, these screens are generally quite small so that the number of persons viewing the screen is limited.

It is sometimes desired to project on a large screen the images, such as color images, generated by a data processing system. This screen can be disposed at one end of a room so that all of the people in the room can simultaneously view such image. In this way, the number of people viewing the image can be significantly multiplied in comparison to the number of people capable of viewing an image on the display screen normally associated with the data processing system.

When images are projected onto a large screen, the different colors or shades of single color in the image are generally converted into different shades of gray. This is often quite sufficient for business purposes to impart, to the persons viewing the large screen, the information represented by such image. For example, different segments of a pie may be projected onto a large screen to indicate the percentages of the total sales volume represented in a company by different products of the company.

Systems are now in use, and have been in use for some time, for projecting images, such as color images, on a large screen to provide, in different shades of gray, the information represented by the different colors in the images. These systems use a two-level display such as a Liquid Crystal Display (LCD) panel placed on top of a standard overhead projector. There is a serious problem with these systems. They have a distinctive flicker as the color image is displayed in gray scale on the screen. This flicker is sufficiently pronounced so that it is disturbing to the people viewing the screen.

Since the, flicker is pronounced and disturbing, a considerable effort has been made, and significant amounts of money have been expended, to provide a system which provides a gray scale indication without any flicker of an image, such as a color image, on a screen by using a two-level display such as a liquid crystal display panel. In spite of such efforts and expenditure of money, the flicker in such systems persists.

This invention provides a system and a method which overcome the above difficulty in a simple, reliable and efficient manner. The system of this invention is able to provide a gray scale projection of an image, such as a color image, on a large screen so that the gray scale image can be viewed by people without any flicker in the image. The system provides such a gray scale projection while using a two-level display such as a liquid crystal diode display panel. As a practical matter, the system of this invention is no more complicated than the systems of the prior art.

In one embodiment of the invention, a system projects an image, such as a color image, in gray scale on a large screen, the image being provided by a display such as that obtained from liquid crystal diodes. In such a system, the different colors or shades are indicated on the screen by individual shades of gray. The color image is defined by a plurality of pixels which are raster scanned. At each pixel position, a plurality of first digital signals are generated each representing an individual color (e.g. red, green and blue) or shade in the image at the position. Second digital signals individually representing such different primary colors are also produced on a pseudo-random basis such as by producing video clocked signals at all of the clock positions in the complete scan. The second signals are repetitively counted to a particular value to correspond to successive frames in the video image.

In each successive frame, the first signals are compared in value with the second signals at each individual pixel position. A video signal is produced for generating the image for that pixel on the large screen only when the first signals for each pixel in a raster scan have a greater digital significance than, or an equal significance to, the second signals for that pixel in that raster scan.

In each repetitive count of frames to a particular value, a video signal is produced for each pixel in a number of frames dependent upon the digital significance of the first digital signals for that pixel. However, such video signals are produced for each pixel in a different pattern of frames in each repetitive count to the particular value so as to eliminate any flicker in the video image projected on the large screen for that pixel by the display such as that formed from the liquid crystal diodes.

In the drawings:

FIG. 1 is a schematic diagram, partially in block form, of circuitry constituting one embodiment of the invention;

FIG. 2 is a schematic diagram illustrating portions of a visual image and different colors in each such portion of the visual image;

FIG. 3 is a chart illustrating how different colors or shades in the visual image of FIG. 2 may be converted to an image in a gray scale on a large screen where each different color or shade in the visual image is converted to an individual shade of gray on the large screen by passing a pixel signal in a particular average number of frames dependent upon the shade of gray to be provided;

FIG. 4 is a schematic representation of the difference between the distribution of "on" pixels on a large screen by the system of FIG. 1 in comparison to the gray scale indication provided at the pixel by the systems of the prior art;

FIG. 5 illustrates a specific example of how the system of this invention operates to convert a color signal, or a signal representing shades, for a pixel to a particular shade of gray for that pixel on a large screen without any flicker in the image on the screen; and FIG. 6 illustrates equipment for projecting on a screen a gray scale image produced from a color image, or an image in different shades, by the system of FIG. 1.

FIG. 2 illustrates portions of a color image 10 generated in a raster scan in one frame. As will be seen, red, blue, green, yellow and magenta colors are represented at such different portions of the video image 10 in the frame. It will be appreciated that the entire frame is provided with individual colors to represent a composite image and that the different portions in FIG. 2 are illustrative of the different colors which may be provided at all of the positions in the image. Although the system is primarily directed to color images, it is operative within the scope of the invention with respect to images in different shades of a single color.

FIG. 6 illustrates a system for projecting the color image of FIG. 1 as an image on a large screen 12. The system includes a transmissive panel 13 such as that provided by an array of liquid crystal diodes. The liquid crystal diodes may be formed in a conventional manner to have two (2) modes of operation—on and off. The "on" mode may be produced for a liquid crystal diode when the liquid crystal diode receives a binary "1" signal and the "off" mode may be produced when the liquid crystal diode receives a binary "0" signal. Each liquid crystal diode may be positioned to correspond to the position of a pixel on a video display screen.

The transmissive panel 13 receives the images produced by the system shown in FIG. 1, converts the color or shade to a gray scale and projects these images in the gray scale code on the screen. The images projected on the screen 12 are in different shades of gray, each corresponding to an individual one of the colors in the image shown in FIG. 1. The system of FIG. 6 may be used in large rooms to provide a visual display to persons assembled in the room. The system of FIG. 6 may be used to provide displays of business information such as charts and graphs to the persons assembled in the room.

FIG. 3 illustrates a chart of how the system of FIG. 1 projects on the screen 12 different shades of gray each representative of an individual color in the image shown in FIG. 2. The chart shown in FIG. 3 is disposed in eight (8) rows and four (4) columns. The columns represent the primary colors such as red, green and blue in a binary form. A binary "0" represents the "off" state of the color and a binary "1" represents the "on" state of the color. The different rows in FIG. 2 represent individual colors which are respectively black, blue, green, cyan (green blue), red, magenta (purple red), yellow and white. It will be appreciated that these colors are only exemplary and that different colors may be selected than those specified above. Preferably, however, the different colors are selected to cover the color spectrum. It will be appreciated that the different indications of color in the chart of FIG. 3 may be replaced by different shades of a single color or by different shades of more than one color.

A fourth column is shown in FIG. 3. This represents the conversion of the different colors or shades in FIG. 3 to individual shades of gray. This is generated by producing a signal for each pixel in an average number of frames, the average number being different for each individual color. In determining this average, a particular number of successive frames (e.g. 7) may be selected as a group to constitute the denominator for determining the shade of gray to be generated for each pixel. For example, when no signal is produced at a particular pixel in each group of seven (7) successive frames, a black indication is provided at the pixel. Similarly, a white indication is provided at the pixel when a signal is produced at the particular pixel in every seven (7) successive frames in each group. A relatively light shade of gray is produced when an average of only two (2) signals is produced in every group of seven (7) successive frames. This corresponds to a color of magenta in the color image 10 of FIG. 1. As another example, a moderate shade of gray is produced when an average of four (4) signals is produced in every group of seven (7) successive frames. This corresponds to the blue color.

The top row of FIG. 4 illustrates how the prior art converts into a gray scale digital signals representing a particular color. These signals represent the color cyan (green-blue) in the chart shown in FIG. 3. As will be seen in the row of FIG. 4, three (3) frames are chosen in every group of seven (7) successive frames. Furthermore, in each such group the same three (3) frames are selected. In the example shown in FIG. 5, the three (3) frames selected in each group may be the first three (3). This means that no signals are produced in the last four (4) frames of each group. As a result, a flicker is produced in the production of the gray scale image on the large screen 12.

This invention provides a system and method in which signals for an average of three (3) frames out of seven (7) in each group are produced to convert the cyan color, or a particular shade, to an individual shade of gray. However, the signals are produced on a pseudo-random basis in each group of seven (7) frames. For example, as illustrated in the second row of FIG. 4, in the first group, the signals may be produced in the second (2d), fifth (5th) and sixth (6th) frames; in the second group, the signals may be produced in the second (2d), fifth (5th) and seventh (7th) frames; and in the third group, the signals may be produced in the second (2d), third (3d) and sixth (6th) frames. Three (3) signals do not have to be produced in each group of seven (7) frames to convert the cyan color to an individual shade of gray. For example, signals may be produced in four (4) frames for certain groups and in two (2) frames for other groups. This is illustrated by the production of signals in four (4) frames in the fourth (4th) group in the second column of FIG. 4. On the average, however, the pixel will be on for every three (3) frames out of seven (7) in this example.

FIG. 1 illustrates one embodiment of a system for producing signals to represent a gray code as shown in Figure and the second column of FIG. 4. The system shown in FIG. 1 includes a plurality of lines 20, 22 and 24 for individually receiving signals representing primary colors such as red, green and blue, or signals representing different shades of a single color, for each pixel in the video image 10. The signals on the lines 20, 22 and 24 may be binary so that they are represented by a binary "1" or a binary "0". The signals on the lines 20, 22 and 24 may be obtained from a data processing unit 26 which operates to convert into binary form the signals produced to represent the binary colors for each pixel in the image 10. For a signal above a particular amplitude for each primary color, a signal representing a binary "1" is produced. For each signal below a particular amplitude for each primary color, a signal representing a binary "0" is produced.

The video signals 20, 22 and 24 are accompanied by a video clocked signal 40. The video clocked signal 40 includes not only the video clocked pulses for each visible pixel but also includes the signals produced during the horizontal and vertical retraces. The video clocked signal 40 is at a frequency corresponding to the frequency at which the signals are produced by the data processing unit 26 and introduced to the lines 20, 22 and 24.

The video clocked signals 40 are introduced to a counter 42 which operates to count the video clocked signals to a particular value such as seven (7) on a repetitive basis. A particular count such as "7" is chosen since this does not divide evenly into the number of clocked positions, including the pixels and the horizontal and vertical retrace, in each frame. As a result, for any given pixel represented by the signals on the lines 20, 22 and 24, the signals simultaneously produced on the lines 32, 34 and 36 may represent a different pixel on a frame-by-frame basis. Furthermore, the signals produced on the lines 32, 34 and 36 simultaneously with the particular pixel represent different pixel positions on a pseudo-random basis.

A comparator 30 compares the digital value represented by the signals on the lines 20, 22 and 24 for each pixel with the digital value represented by the signals simultaneously provided on the lines 32, 34 and 36. The signals produced on the lines 20, 22 and 24 for each particular pixel in successive frames may have a constant value as indicated by the indication in the second row of FIG. 5B. For example, for a cyan color or for a particular shade of a single color, this value for each such particular pixel is represented by the integer "3" as indicated in FIG. 5B. However, the signals simultaneously produced on the lines 32, 34 and 36 at the time of occurrence of each such particular pixel in the successive frames has a pseudo-random value because these signals indicate different values on a frame-to-frame basis. This is indicated in FIG. 6 by the first row of integers shown in FIG. 5A.

The comparator 30 compares the values represented in FIG. 5B by the constant value "3" for a particular pixel in the successive frames with the pseudo-random values (shown as an example in FIG. 5A) represented by the signals on the lines 32, 34 and 36. When the constant value of the signals on the lines 20, 22 and 24 for the particular pixel is equal to, or greater than, the pseudo-random value of the signals on the lines 32, 34 and 36, the comparator 30 presents a logic "HIGH" to the output line 52. However, when the value of the signals on the lines 20, 22 and 24 for the particular pixel is less than the value of the signals on the lines 32, 34 and 36, a logic "LOW" is produced at the output line 52. The signals on the output line 32 are introduced to the transmissive panel 13 such as a panel produced from liquid crystal diodes.

Since the signals produced on the lines 32, 34 and 36 have a pseudo-random value between "0" and "7" for each particular pixel in the successive frames, a signal will be developed on the output line 52 for each such pixel only an average number of times in each group (such as 7) of successive frames. In the example shown in FIG. 5, the average will be three (3) out of seven (7) frames for the pixel represented in the Figure. Furthermore, since the signals on the lines 32, 34 and 36 have a pseudo-random value, the signal developed on the line 52 for each particular pixel will be produced at different pixel positions in each group of seven (7) frames. This will provide the desired gray scale for each particular pixel without any flicker in the image on the large screen 12. It will be appreciated that the same number of signals may not be developed on the line 52 in each group of seven (7) successive frames. For example, for a gray scale of "3", four (4) frames out of seven (7) may be activated in some groups, three (3) frames out of seven (7) may be activated in other groups and two (2) frames out of seven (7) may be activated in still other groups. This may be seen from the representation in the second row of FIG. 4.

Although the discussion above has proceeded on the basis of developing a gray scale image, the development of individual colors, or shades of a single color other than black is also within the scope of the invention. If different colors are projected on the screen by the system of this invention, they may be different from the colors represented on the lines 22, 24 and 26 or they may be produced from the signals provided on the lines 22, 24 and 26 to represent different shades of a single color. All of these variations are within the scope of this invention since they provide an image without any flicker. The term "gray scale" as used in the claims is accordingly intended to include all of the different variations discussed above.

Although this invention has been disclosed an illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination with a display system for providing a visual image, a gray scale arrangement for producing a visual image wherein the visual image includes a plurality of parallel display lines forming a frame, each display line including a plurality of individual pixels forming part of the visual image, said arrangement comprising:

means for receiving video clock signals for controlling the displaying of the visual image in successive frames, each one of said frames being defined by a frame time interval, said frame time interval being defined by a frame time predetermined number of said video clock signals;

means for receiving intensity level signals, each one of said intensity level signal being indicative of a desired pixel image shading level for a given pixel element during a large number of successive frame time intervals;

means responsive to said video clock signals for producing a series of intensity level averaging signals arranged in recurring groups of said averaging signals;

said groups of intensity level averaging signals recurring during each frame time interval, each one of said groups including a shading level predetermined number of said averaging signals, said shading level predetermined number not being evenly divisible into said frame time predetermined number for causing different ones of said averaging signals to occur during successive frame time intervals for a given pixel element; and means for comparing the individual ones of said intensity level signals and individual corresponding one of said intensity level averaging signals to develop and output signal to cause the display system to be activated selectively whenever the value of the intensity level signal is at least equal to the value of said corresponding intensity level averaging signal, whereby the average intensity level for each pixel image over a larger number of successive frame closely approximates said desired pixel image shading level.

2. In combination with a display system, a scaling arrangement, comprising:

means for receiving video clock signals for controlling the displaying information in successive frames, each one of said frame being defined by a frame time interval, said frame time interval being defined by a frame time predetermined number of said video clock signals;

means for receiving intensity level signals, each one of said intensity level signals being indicative of a desired pixel image shading level for a given pixel element during a larger number of successive frame time intervals;

signal means responsive to said video clock signals for generating intensity level averaging signals arranged in recurring groups of said averaging signals;

said groups of intensity level averaging signals recurring during each frame time interval, each one of said groups including a shading level predetermined number of said averaging signals, said shading level predetermined number not being evenly divisible into said frame time predetermined number for causing different ones of said averaging signals to occur during successive frame time intervals for a given pixel element; and means for comparing individual ones of said intensity level signals and individual ones of said intensity level averaging signals for a given pixel element to cause the display system to be activated selectively, whereby the average intensity level for each given pixel image over a larger number of successive frame closely approximates said desired pixel image shading level.

3. An arrangement as set forth in claim 1, wherein each one of the intensity level signals is a binary coded signal indicative of the color composition of said pixel image and wherein the comparing means compares each one of the binary coded signals with a corresponding one of intensity level averaging signals to obtain the production of a series of individual pixels in successive frames, each pixel exhibiting a gray scale effect.

4. An arrangement as set forth in claim 1, further comprising:
means for displaying, said means for displaying being a liquid crystal display having a plurality of liquid crystal cells, each cell being disposed at a different position and corresponding to a pixel element in said means for displaying.

5. In combination, with a display system for displaying a plurality pixel images, in successive frames, each frame defined by a frame time interval, a multiple intensity level control arrangement, comprising:
means for supplying first number signals, for each pixel in a visual image, each one of said first number signals representing the color of the pixel image to be displayed at a given pixel element location;
means for supplying second number signals;
means for providing a count of the second number signals to a particular value on a repetitive basis;
means responsive to said individual ones of said first number signals and said means for providing a count for developing third signals for each given pixel element location in accordance with the characteristics of said first signals as compared to the output of said means for providing a count, said output simultaneously occurring for each such pixel element location; and
means for providing a video output signal for each said given pixel element location in accordance with the development of the third signals for the pixel images in each successive frame.

6. An arrangement as set forth in claim 15 further comprising:
means for arranging the successive frames into groups;
signal means being responsive to video clock signals to develop a series of recurring digital signals, said series of recurring digital signals including a starting signal, said starting signal being randomly selected at the beginning of each successive frame to be any one of said recurring digital signals; and
means for comparing the given intensity level signal for each pixel with a corresponding simultaneously generated counter signal to obtain the development of a video signal for that pixel only for each such pixel on an average number of frame in each group dependent upon the characteristics of the corresponding given intensity level signals for pixels.

7. In combination for providing in a visual display, an arrangement for shading the emitted light from the individual displayable pixel of an image displayed repetitively in successive frames in a substantially flicker free manner, said arrangement comprising:
means for providing intensity level signals to represent the intensity level of each displayable pixel in the visual display;
counting means for generating a series of binary signals indicative of a series of numbers ranging between a maximum value and a minimum value corresponding to each one of the displayable pixels for each frame, where the difference between said maximum and minimum values corresponds to a desired number of shading levels for the individual displayable pixels of an image;
means for comparing said intensity level signals and said binary signals for each displayable pixel location of each one of the frames in the visual display and for developing a video output signal when the intensity level signal is at least equal to a corresponding binary signal; and
means for causing said means for comparing to compare repeated each intensity level signal corresponding to a given pixel, with another ones of the binary signals corresponding to the given pixel for individual ones of a sufficiently large number of the successive frames to produce a desired average shading corresponding substantially to the intensity level of said displayable pixel.

8. In a combination as set forth in claim 7, wherein said means for causing said series of signals for each of the successive frames includes means responsive to a video clock signal, said clock signal occurring during each of the first signals and during the horizontal retraces and the vertical retrace in each of the successive frames.

9. In a combination as set forth in claim 8, wherein said means for generating includes means for counting the video clock signals to a particular count on a repetitive basis.

10. In a combination as set forth in claim 9, wherein the maximum count in the counting means is a value not divisible by a whole number divided into the total number of binary signals occurring in each of the successive frames so that said series of binary signals commence their recurring sequence arbitrarily at the beginning of each new frame of the successive frames.

11. In a combination as set forth in claim 7, further comprising: means for producing a visual display; said means for producing including means for projecting the visual display as gray scale image on a screen.

12. In a combination as set forth in claim 11, wherein said means for producing a visual display further includes a plurality of members disposed at positions corresponding to the positions of the displayable pixels and said members being constructed to emit light in accordance with the video output signal.

13. In a visual display, a method for shading the emitted light from the individual displayable pixels of an image displayed repetitively in successive frames in a substantially flicker free manner, said method comprising:

providing intensity level signals to represent the intensity level of each displayable pixel in the visual display;

generating a series of binary signals indicative of a series of numbers ranging between a maximum value and a minimum value corresponding to each one of the displayable pixels for each frame, where the difference between said maximum and minimum value corresponds to a desired number of shading levels for the individual displayable pixels of an image;

comparing said intensity level signals and said binary signals for each displayable pixel location of each one of the frames in the visual display and for developing a video output signal when the intensity level signal is at least equal to a corresponding binary signal; and comparing repeatedly each intensity level signal corresponding to a given pixel, with another one of the binary signals corresponding to the given pixel for individual ones of a sufficiently large number of the successive frames to produce a desired average shading corresponding substantially to the intensity level of said displayable pixel.

14. A method as set forth in claim 13, wherein the step of generating a series of binary signal includes the step of:

randomizing substantially said series of signals for each of the successive frames responding to a video clock signal, said clock signal occurring during each of the first signals and during the horizontal retraces and the vertical retraces in each of the successive frames.

15. In combination for providing in a visual display, an arrangement for shading the emitted light from the individual displayable pixels of an image displayed repetitively in successive frames comprising:

means for providing a visual display;

means for providing a raster scan of each pixel in the successive frames of the visual display;

means for providing for each displayable pixel in the raster scan of the successive frames of the visual display control signals representing the shading levels for each said displayable pixel;

means for causing the control signals representing the shading levels for each of the individual displayable pixels in the raster scan to be displayed in a substantially flicker free manner;

means for segregating the successive frames into groups, each such group having a given number of successive frames; and said means providing control signals developing a video signal selectively for individual pixels only an average number of times in any group of successive frames and to develop said video signal in different frames in successive groups on a random basis.

16. In combination with a display system for displaying information in successive frames each defined by a frame time interval, a multiple intensity level control arrangement, comprising:

intensity level averaging means for generating a predetermined set of recurring averaging signals indicative of a given number of different intensity level, said signals within said set being generated individually seriatim;

means for receiving a level determining signal corresponding to a selected one of said different intensity level recurring signals said level determining signal being indicative of a desired intensity level for a given pixel element image;

means for comparing said level determining signal and individual ones of the recurring averaging signals to cause said display system to be activated selectively;

means for receiving recurring display frame determining signals to cause said intensity level means to generate the next one of its averaging signals, said predetermined set of recurring signals defining an averaging time interval not being evenly divisible into each one of the frame time intervals to cause the averaging time intervals and the frame time intervals to be asynchronous relative to one another; and wherein said means for comparing being responsive to said frame determining signals during the same portion of each frame time interval, whereby the average intensity level over a larger number of frames closely approximates a selected intensity level.

17. An arrangement according to claim 16, wherein said intensity level averaging means is a counter generating said predetermined set of recurring average signals.

18. An arrangement according to claim 16, wherein said counter is a digital counter.

19. An arrangement according to claim 16, wherein each said recurring display frame determining signal is a recurring video clock signal.

20. An arrangement according to claim 16, wherein said means for comparing includes means for generating a video signal for every recurring display frame determining signal.

21. An arrangement according to claim 15, further comprising:

means for receiving a series of individual clock signals, each individual clock signal being indicative of a discrete time period for helping to form a displayable image;

means for receiving a series of individual pixel signals, each individual pixel signal having a binary value indicative of the intensity level of an individual displayable pixel in a series of pixels forming a displayable image;

said displayable image being formed during M discrete time periods wherein each discrete time period corresponds to an individual clock signal; and counter means responsive to said clock signals for generating a series of N individual number signals, each number signal being indicative of a pseudo intensity level and having a binary value within a range of binary value corresponding to the binary values of the individual ones of said pixel signals;

comparing means for determining whether the binary value for individual ones of the pixel signals equal or exceed the binary value for individual ones of the signals generated by said counter means during corresponding time periods;

said comparing means generating a output signal whenever the binary value of an individual one of the pixel signals in a given displayable image equals or exceeds the binary value of an individual one of the signals generated by said counter means during a corresponding discrete time period; and wherein the binary values of the number signals and the pixel signals do not exceed the value N, where N is a number not evenly divisible into the number M indicative of the total number of individual clock signals in a single frame of the displayable image.

22. An arrangement according to claim 21, wherein said counter means produces a sequence of recurring numbers, said sequence commencing at the beginning of each frame, in a series of successive frames of the same displayable image, arbitrarily at any given individual one of said recurring numbers to cause said displayable image to be displayed in a substantially flicker free manner.

23. A method for controlling the intensity level of an image displayed in a series of successive frames, comprising:

receiving video clock signals for controlling the displaying of information in successive frames, each one of said frames being defined by a frame time interval, said frame time interval being defined by a frame time predetermined number of said video clock signals;

receiving intensity level signals, each one of said intensity level signals being indicative of a desired pixel image shading level for a given pixel element during a large number of successive frame time intervals;

generating a series of intensity level averaging signals arranged in recurring groups of said averaging signals;

causing different ones of said averaging signals to occur during successive frame time intervals for a given pixel element; and comparing the individual ones of said intensity level signals and individual corresponding ones of said intensity level averaging signals for a given pixel element to develop an output signal to cause a display system to be activated selectively, whenever the value of the intensity level signal is at least equal to the value of said corresponding intensity level averaging signal whereby the average intensity level for each given pixel image over a large number of successive frames closely approximates said desired image shading level.

24. A method according to claim 23, wherein said receiving intensity level signals include a receiving a series of individual pixel signals, each individual pixel signal having a binary value indicative of the intensity level of an individual displayable pixel in a series of pixels forming a displayable image.

25. A method according to claim 23, further comprising:

generating a video signal in response to comparing individual ones of said intensity level signals with individual ones of said intensity level averaging signal.

* * * * *